(12) United States Patent
Liu et al.

(10) Patent No.: US 10,180,747 B2
(45) Date of Patent: Jan. 15, 2019

(54) TOUCH DISPLAY PANEL HAVING TOUCH ELECTRODES AND PRESSURE SENSING ELEMENT AND TOUCH DISPLAY DEVICE THEREOF

(71) Applicants: SHANGHAI TIANMA MICRO-ELECTRONICS CO., LTD., Shanghai (CN); TIANMA MICRO-ELECTRONICS CO., LTD., Shenzhen (CN)

(72) Inventors: Liang Liu, Shanghai (CN); Feng Lu, Shanghai (CN); Shaolong Ma, Shanghai (CN); Qijun Yao, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 162 days.

(21) Appl. No.: 15/181,566

(22) Filed: Jun. 14, 2016

(65) Prior Publication Data
US 2017/0242518 A1    Aug. 24, 2017

(30) Foreign Application Priority Data
Feb. 24, 2016    (CN) .......................... 2016 1 0100923

(51) Int. Cl.
G06F 3/041    (2006.01)
G06F 3/047    (2006.01)
G06F 3/044    (2006.01)

(52) U.S. Cl.
CPC ............ *G06F 3/0414* (2013.01); *G06F 3/044* (2013.01); *G06F 3/047* (2013.01); *G06F 3/0412* (2013.01);
(Continued)

(58) Field of Classification Search
CPC ...................................................... G06F 3/0414
(Continued)

(56) References Cited

U.S. PATENT DOCUMENTS

| | | | |
|---|---|---|---|
| 2010/0194710 A1* | 8/2010 | Koito ..................... | G06F 3/0412 345/174 |
| 2014/0085253 A1 | 3/2014 | Leung et al. | |

(Continued)

FOREIGN PATENT DOCUMENTS

CN                104834419 A      8/2015

*Primary Examiner* — Long D Pham
(74) *Attorney, Agent, or Firm* — Kilpatrick Townsend & Stockton LLP

(57) ABSTRACT

A touch display panel and a touch display device are provided. They include a first substrate; and a first metal layer formed on one side of the first substrate. The first metal layer includes a plurality of touch electrode lines and a plurality of pressure sensing elements. The pressure sensing elements include segments of pressure sensing lines. At each crossing region where a touch electrode line comes across a pressure sensing element, two adjacent segments of pressure sensing lines are connected through a bridge. A second metal layer is formed between the first substrate and the first metal layer. The second metal layer includes a plurality of data lines extending along a first direction. A third metal layer is formed between the second metal layer and the first substrate. The third metal layer includes a plurality of scan lines extending along a second direction which is orthogonal to the first direction.

17 Claims, 15 Drawing Sheets

(52) U.S. Cl.
CPC .............. *G06F 2203/04106* (2013.01); *G06F 2203/04107* (2013.01); *G06F 2203/04111* (2013.01)

(58) Field of Classification Search
USPC ........................................................ 345/174
See application file for complete search history.

(56) References Cited

U.S. PATENT DOCUMENTS

2017/0010704 A1* 1/2017 Chen ...................... G06F 3/0412
2017/0010730 A1* 1/2017 Chuang ................. G06F 3/0414
2017/0068368 A1* 3/2017 Hsiao .................... G06F 3/0416

* cited by examiner

TOUCH DISPLAY PANEL HAVING TOUCH ELECTRODES AND PRESSURE SENSING ELEMENT AND TOUCH DISPLAY DEVICE THEREOF

CROSS REFERENCE

This application is based upon and claims priority to Chinese Patent Application No. 201610100923.3, filed on Feb. 24, 2016, the entire contents thereof are incorporated herein by reference.

TECHNICAL FIELD

The present disclosure relates to the field of display technology, and more particularly, to a touch display panel and a touch display device through which pressure touch can be implemented in a capacitance touch display panel.

BACKGROUND

Touchscreen, as an input medium, is one of most simple, convenient and intuitive human-computer interaction manner for now. Integrating a touch feature into a display device has become a focus of display development for more and more panel display manufacturers.

FIG. 1A is a structural diagram of a typical mutual capacitance touch display panel in the prior art. As shown in FIG. 1A, a touch display panel 10A includes a plurality of scan lines 122 extending in a direction X, a plurality of data lines 124 extending in a direction Y, a plurality of touch driving electrodes 101 in blocks arranged in an array along the directions X and Y, and a plurality of touch sensing electrodes 103 arranged along the direction X. The plurality of touch driving electrodes 101 and the plurality of touch sensing electrodes 103 are formed such that they are perpendicular to each other. The touch driving electrodes 101 are connected to a control unit 108 via touch driving electrode lines 107, and the touch sensing electrodes 103 are connected to the control unit 108 via touch sensing electrode lines 109. The control unit 108 transmits touch driving signals to the touch driving electrodes 101 via the touch driving electrode lines 107. When a finger touches the panel from outside, a capacitance at each intersection 102 between the touch driving electrodes 101 and the touch sensing electrodes 103 changes, and signals based on the changes of the capacitances on the touch sensing electrodes 103 are received via the touch sensing electrode lines 109, for determining the touch location. As shown in FIG. 1A, the touch driving electrodes 101 and the touch sensing electrodes 103 are disposed in the same layer, and in order to prevent short circuits from being formed due to overlapping of the touch driving electrodes 101 and the touch sensing electrodes 103, touch driving electrodes 101 in the same row are connected by metal bridges 105

FIG. 1B is a schematic diagram of a typical self-capacitance touch display panel in the prior art. As shown in FIG. 1B, a touch display panel 10B includes a plurality of scan lines 126 extending in a direction X, a plurality of data lines 128 extending in a direction Y, a plurality of touch electrodes 104 in blocks arranged in an array along the directions X and Y. Each of the touch electrodes 104 is connected to a control unit 110 via a touch electrode line 106. The operation of the self-capacitance touch display panel 10B differs from that of the mutual capacitance touch display panel 10A in that the touch electrodes 104 in blocks of the self-capacitance touch display panel 10B functions as both of the touch driving electrodes and the touch sensing electrodes, and the control unit 110 transmits touch driving signals to the touch electrodes 104 via the touch electrode lines 106. When a finger touches the panel from outside, capacitances of the touch electrodes 104 change. The changes of the capacitances are sensed by the touch electrodes 104 for determining the touch location. As shown in FIG. 1B, in order to avoid signal disturbance between the touch electrodes 104 and the touch electrode lines 106, the touch electrodes 104 and the touch electrode lines 106 are positioned at different film layers, and connected to each other through via holes 108.

As described above, neither of the mutual capacitance touch display panel design as shown in FIG. 1A and the self-capacitance touch display panel design as shown in FIG. 1B is integrated with a pressure touch feature. Pressure touch means that when a finger touches a touch panel from outside with a pressure, the touch panel can generate a sensing signal depending on the amplitude of the pressure, so as to perform a corresponding operation. Currently, there are mainly two forms of pressure touch for a display panel: one is resistive pressure touch and the other is capacitive pressure touch. Where, the resistive pressure touch draws attention in the industry due to its high sensitivity and low cost. For a resistive pressure touch, a strain gauge is provided in a display panel, and the strain gauge has a resistance value changing with the deformation of the strain gauge. The resistance value or a voltage value of the strain gauge is measured to measure the pressure from outside.

FIG. 1C is a schematic diagram of a resistive Wheatstone bridge for test pressing pressures. Four resistors R1, R2, R3, R4 are connected to form a quadrilateral ABCD, referred to as four arms of the bridge. The quadrilateral ABCD has a diagonal BD connected to a galvanometer G, and another diagonal AC connected to a power source E. When the power source E is turned on, currents flow through each branch of the bridge. When the four resistors R1, R2, R3, R4 have resistances satisfying R1/R4=R2/R3, the Wheatstone bridge is in balance, and the galvanometer G reads zero current. When the four resistors R1, R2, R3, R4 have resistances not satisfying the above condition, potentials between points B and D are not equal to each other, and the galvanometer G reads a current other than zero, and the ratio of the resistances of the four resistors R1, R2, R3, R4 can be calculated from the output of the galvanometer G.

Currently, for a resistive pressure touch display panel, a strain gauge is typically disposed under a backlight layer of the display panel or at the periphery frame of the display panel. When the strain gauge is disposed under the backlight layer of the display panel, the thickness of the entire display panel will be increased, which is not conducive to the thinning of the display panel. Moreover, since the strain gauge is disposed under the backlight layer, the sensitive for finger touch will be significantly reduced, resulting in reduced touch sensitivity. When the strain gauge is disposed at the periphery frame of the display panel, since the periphery frame of the display panel is generally attached by double-sided adhesive tapes, and gap inevitably exists between the tape and the display panel, deformation of the surface of the display panel caused by pressure will be significantly influenced by the gap, resulting in reduced accuracy in pressure touch.

SUMMARY

To overcome the problems in the prior art, one objective of the present disclosure is to provide a touch display panel which can detect amplitude of pressure and detect touch location. That is, the touch display panel of the present disclosure integrate features of display, touch and pressure touch.

Embodiments provide a touch display panel. The touch display panel include a first substrate and a first metal layer formed on one side of the first substrate. The first metal layer includes a plurality of touch electrode lines and a plurality of pressure sensing elements. The pressure sensing elements include segments of pressure sensing lines, and at each crossing region where a touch electrode line comes across a pressure sensing element, two adjacent segments of pressure sensing lines are connected through a bridge. A second metal layer formed between the first substrate and the first metal layer. The second metal layer includes a plurality of data lines extending along a first direction. A third metal layer formed between the second metal layer and the first substrate. The third metal layer includes a plurality of scan lines extending along a second direction which is orthogonal to the first direction.

In another aspect, embodiments provide a touch display device including the above touch display panel.

The touch display panel and the touch display device provided by the present disclosure have the following advantages.

In the present disclosure, pressure sensing elements are provided by utilizing gaps of the metal layers of the touch lines in existing design of the prior art, to implement features of display, touch and pressure touch, without increasing the thickness of the product in existing design of the prior art.

BRIEF DESCRIPTION OF THE DRAWINGS

Other features, objectives and advantages of the present disclosure will become apparent from the detailed description of non-limiting embodiments with reference to the following accompanying drawings.

DETAILED DESCRIPTION

Exemplary embodiments will now be more fully described with reference to the accompanying drawings. However, the exemplary embodiments can be implemented in various forms, and should not be understood as limited to the embodiments set forth herein. On the contrary, these embodiments are provided to make the present disclosure thorough and complete, and to fully convey the concept of the exemplary embodiments to those skilled in the art. Similar numeral reference denotes similar or same parts throughout the accompanying drawings, and repeat description thereof will be omitted.

Figure 2A:
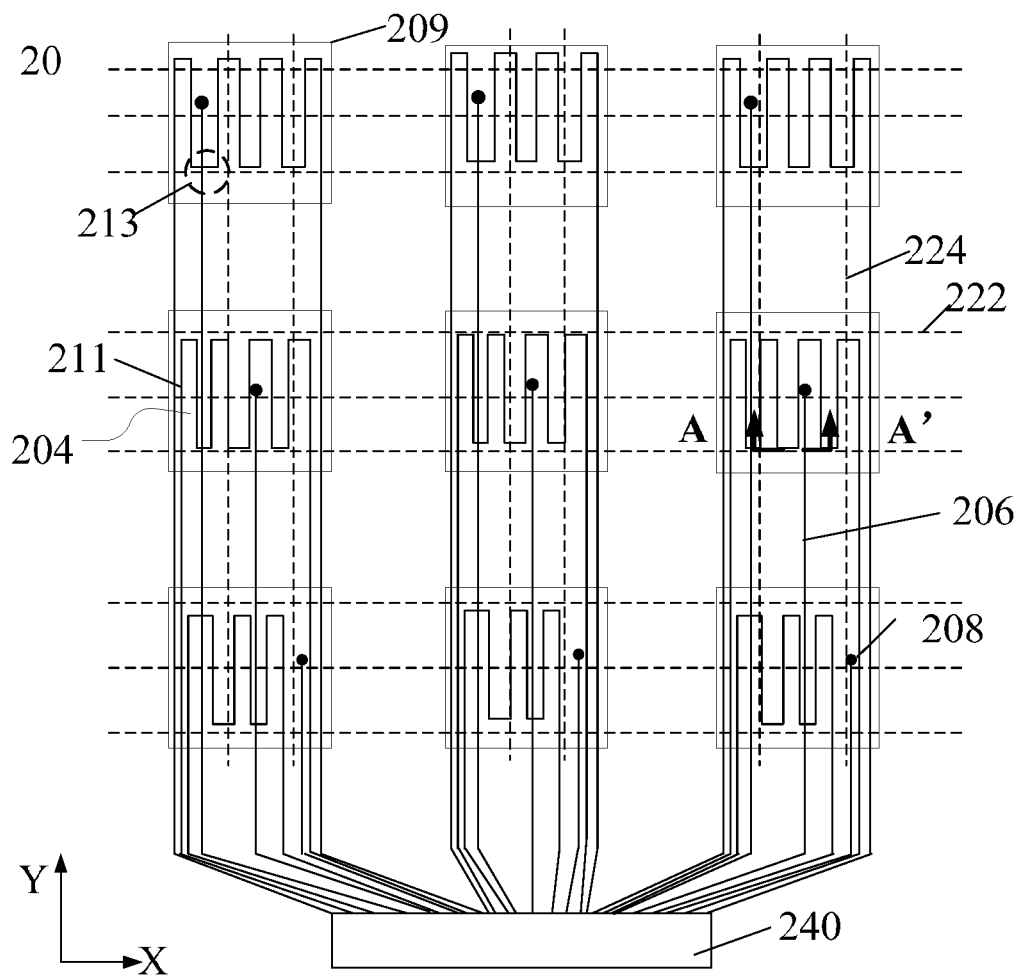
FIG. 2A is a structural diagram of a touch display panel provided by an embodiment of the present disclosure.
Figure 2B:
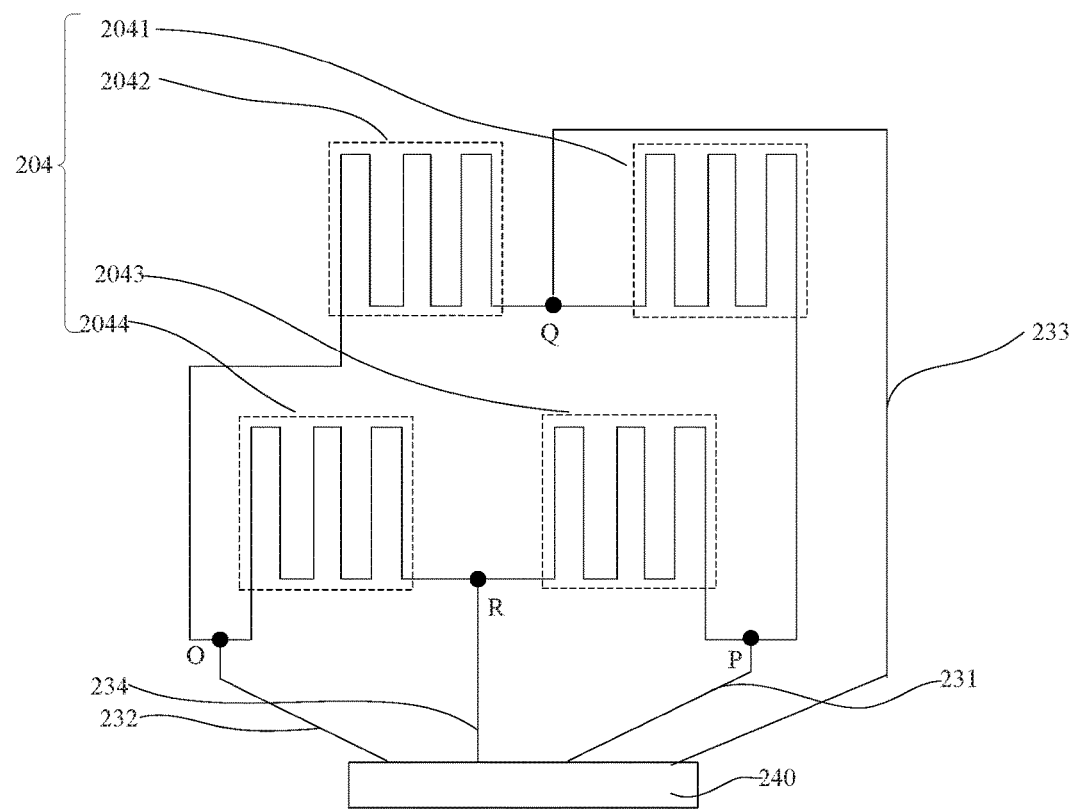
FIG. 2B is a schematic diagram of a touch display panel implementing resistive pressure touch provided by an embodiment of the present disclosure.
Figure 2C:
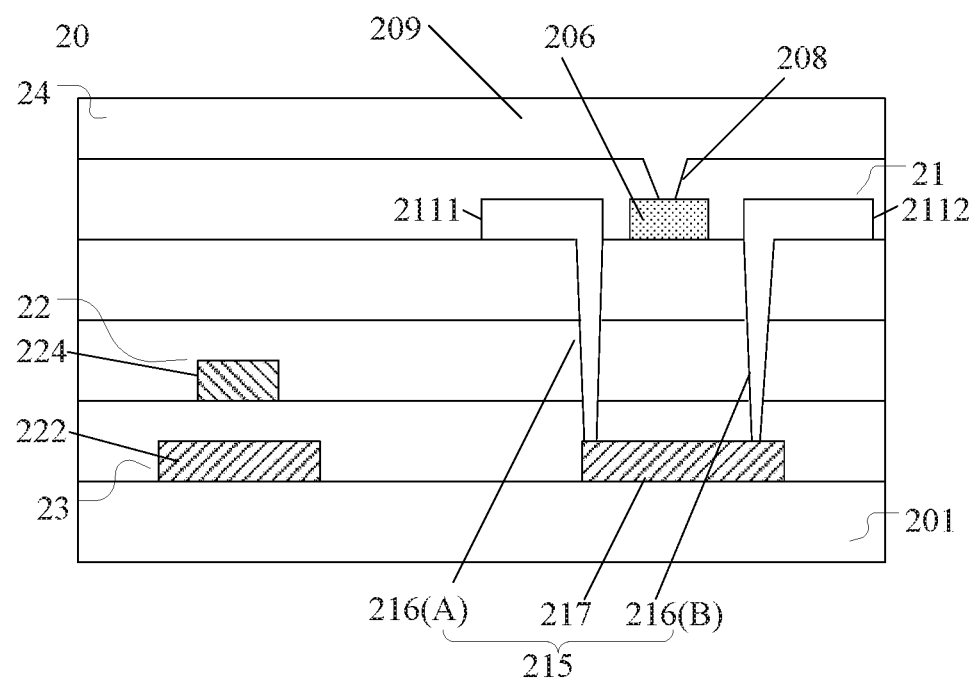
FIG. 2C is a cross sectional view of FIG. 2A along a line A-A'.

FIG. 2A is a structural diagram of a touch display panel provided by an embodiment, and FIG. 2C is a cross sectional view of FIG. 2A along a line A-A'. As shown in FIG. 2A and FIG. 2C, a touch display panel 20 can include a first substrate 201 which includes a first metal layer 21, a second metal layer 22 and a third metal layer 23 thereon. The first metal layer 21 is provided with pressure sensing elements 204 and touch electrode lines 206. Where, each of the pressure sensing elements 204 includes segments of pressure sensing lines 211, and each of the touch electrode lines 206 extends along the direction Y. The second metal layer 22 is provided with a plurality of data lines 224 extending along the direction Y. The third metal layer 23 is provided with a plurality of scan lines 222 extending along the direction X.

As shown in FIG. 2A, the pressure sensing elements 204 form a comb-shaped structure extending along the direction Y and arranged along the direction X. When a pressure is applied from outside, a strain direction of the pressure sensing elements 204 is mainly in the direction Y, changes of the resistance value of the pressure sensing elements 204 caused by the strain in the direction Y is detected to detect the amplitude of the pressure.

FIG. 2B is a schematic diagram of a touch display panel implementing resistive pressure touch provided by an embodiment of the present disclosure. As shown in FIG. 2B, any four pressure sensing elements 2014 (20141, 2042, 2043 and 2044) on the touch display panel 20 form a Wheatstone bridge. One arm of the Wheatstone bridge is provided with a pressure sensing element 204. It should be noted that in the present embodiment, one arm of the Wheatstone bridge can include only one pressure sensing element 204, or can include two or more pressure sensing elements 204 connected in series, which are not intended to be limiting. As shown in FIG. 2B, the pressure sensing elements 20141, 2042, 2043 and 2044 respectively form one arm of the Wheatstone bridge. An input terminal of the pressure sensing element 20141 and an input terminal of the pressure sensing element 20143 are connected to form a node P which is electrically connected to a control unit 240 via a first connection wire 231. An input terminal of the pressure sensing element 2042 and an input terminal of the pressure sensing element 2044 are connected to form a node O which is electrically connected to the control unit 240 via a second connection wire 232. An output terminal of the pressure sensing element 2041 and an output terminal of the pressure sensing element 2042 are connected to form a node Q which is electrically connected to the control unit 240 via a third connection wire 233. An output terminal of the pressure sensing element 2043 and an output terminal of the pressure sensing element 2044 are connected to form a node R which is electrically connected to the control unit 240 via a fourth connection wire 234.

Figure 1A:
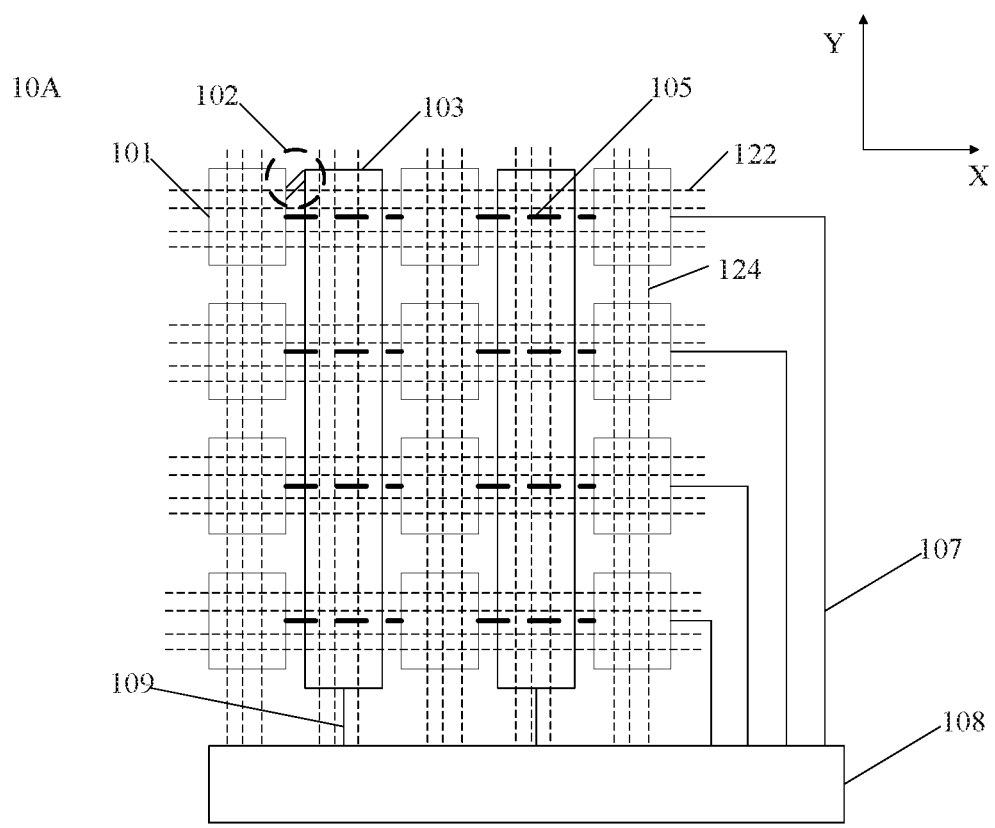
FIG. 1A is a structural diagram of a typical mutual capacitance touch display panel in the prior art.
Figure 1B:
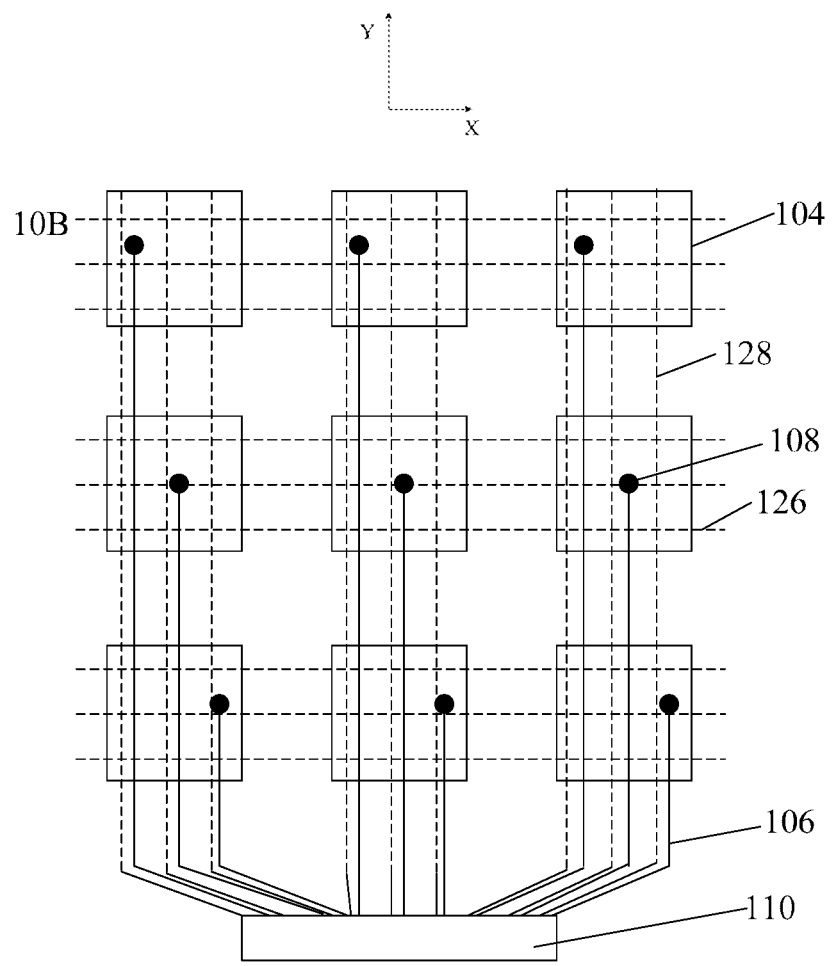
FIG. 1B is a structural diagram of a typical self-capacitance touch display panel in the prior art.
Figure 1C:
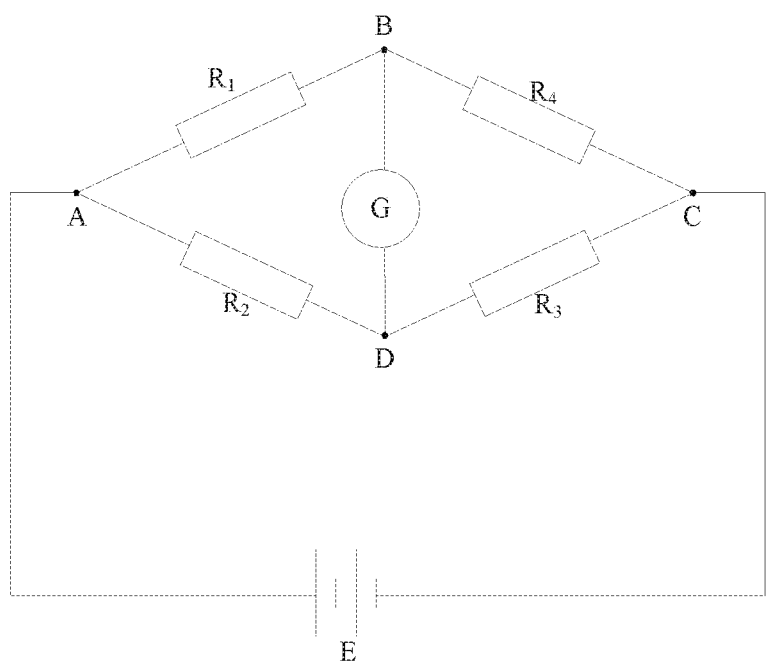
FIG. 1C is a schematic diagram of a resistive Wheatstone bridge for test pressing pressures.

Also referring to FIG. 1C, the resistive pressure touch in the present embodiment is based on the following principle. After the control unit 240 applies an electrical signal on the input terminal nodes P and 0, if no pressure is applied on the touch display panel 20 from outside, the Wheatstone bridge is in balance, and the output terminal nodes Q and R output a zero signal value. When a pressure F is applied on the touch display panel 20 from outside, the entire touch display panel 20 is deformed, the resistances of the pressure sensing elements 20141, 2042, 2043 and 2044 change accordingly, the Wheatstone bridge loses balance, and the output terminal nodes Q and R output a signal value other than zero. Then, the control unit 240 can calculate the size of the pressure F based on the signal value.

Figure 2D:
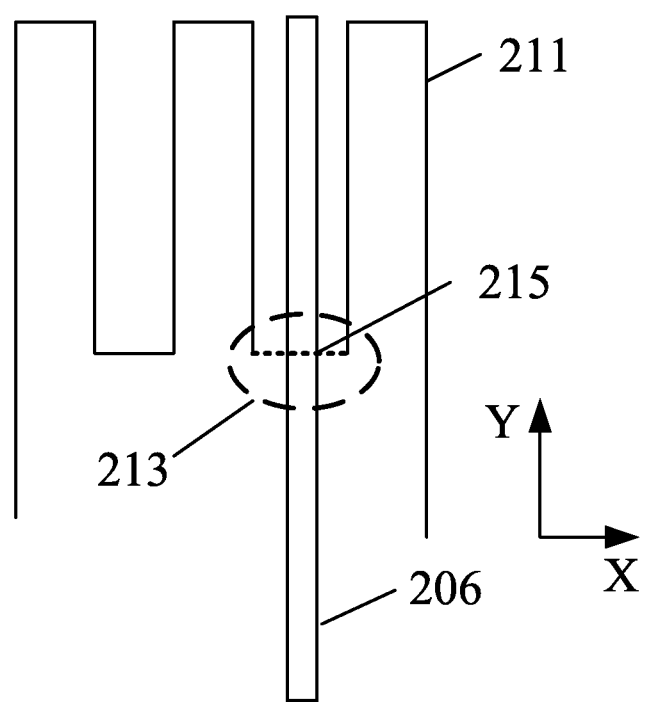
FIG. 2D is a partial enlarged view of FIG. 2A.

Since the pressure sensing elements 204 and the touch electrode lines 206 are disposed in the same layer, pressure sensing lines 211 of the pressure sensing elements 204 will inevitably come across the touch electrode lines 206, at crossing regions 213. FIG. 2D is an enlarged diagram of the crossing regions 213. As shown in FIG. 2D, in order to prevent short circuits from being formed between the pressure sensing lines 211 and the touch electrode lines 206, the pressure sensing lines 211, in this embodiment, are electrically connected through bridges 215 at the crossing regions 213 over the touch electrode lines 206.

Specifically, as shown in FIG. 2C, each of the bridges 215 includes a first bridge conductor 217 and a first via hole 216. In order to prevent the pressure sensing lines 211 from contacting with the touch electrode lines 206, at each portion where a pressure sensing element 204 comes across a touch electrode line 206, the respective pressure sensing line 211, in this embodiment, is cut into two segments of pressure sensing lines 2111 and 2112, which are respectively positioned at one of the two sides of the touch electrode line 206 and both connected to the same first bridge conductor 217 through a first via hole 216, so as to avoid the contact between the pressure sensing line 211 and the touch electrode line 206. Specifically, the pressure sensing line 2111 at the left side of the touch electrode line 206 is connected to the first bridge conductor 217 through the first via hole 216A, and the pressure sensing line 2112 at the right side of the touch electrode line 206 is connected to the same first bridge conductor 217 through the first via hole 216B. Thereby, it can prevent a short circuit from being formed due to overlapping of the pressure sensing line 211 and the touch electrode line 206.

As shown in FIG. 2D, in the touch display panel 20 provided by the present embodiment, the pressure sensing lines 211 extend in the direction X at the crossing regions 213. Therefore, the first bridge conductors 217, in this embodiment, are disposed at the third metal layer 23, and fabricated through the same process with the scan lines 222. This design is advantageous: since the scan lines 222 extend in the direction X, this design can ensure that the first bridge conductors 217 extend in the direction X and moreover. Thus, this design can improve the utilization of the third metal layer 23.

As shown in FIG. 2C, the touch display panel 20 provided by the present embodiment also includes a fourth metal layer 24. The fourth metal layer 24 includes a plurality of touch electrodes 209 in blocks. The touch electrodes 209 are connected to the touch electrode lines 206 through fourth via holes 208. The touch electrodes 209 in blocks of the touch display panel 20 functions as both of the touch driving electrodes and the touch sensing electrodes, and the control unit 240 transmits touch driving signals to the touch electrodes 209 via the touch electrode lines 206. When a finger touches the panel from outside, capacitances of the touch electrodes 209 change, and the changes of the capacitances are sensed by the touch electrodes 209, for determining the touch location.

It should be noted that, in the embodiments of the present disclosure, during a display stage, the plurality of touch electrodes 209 in blocks are also utilized as display common electrodes. That is, during a display stage, the plurality of touch electrodes 209 present a constant common voltage signal, mainly for forming an electric field with a certain strength between the common voltage signal and a signal voltage applied on pixel electrodes, so as to control orientation of light emitting medium such as liquid crystal to form a display image. Alternatively, the plurality of touch electrodes 209 can merely serve as touch electrodes, which is not limited in the present disclosure.

Figure 2E:
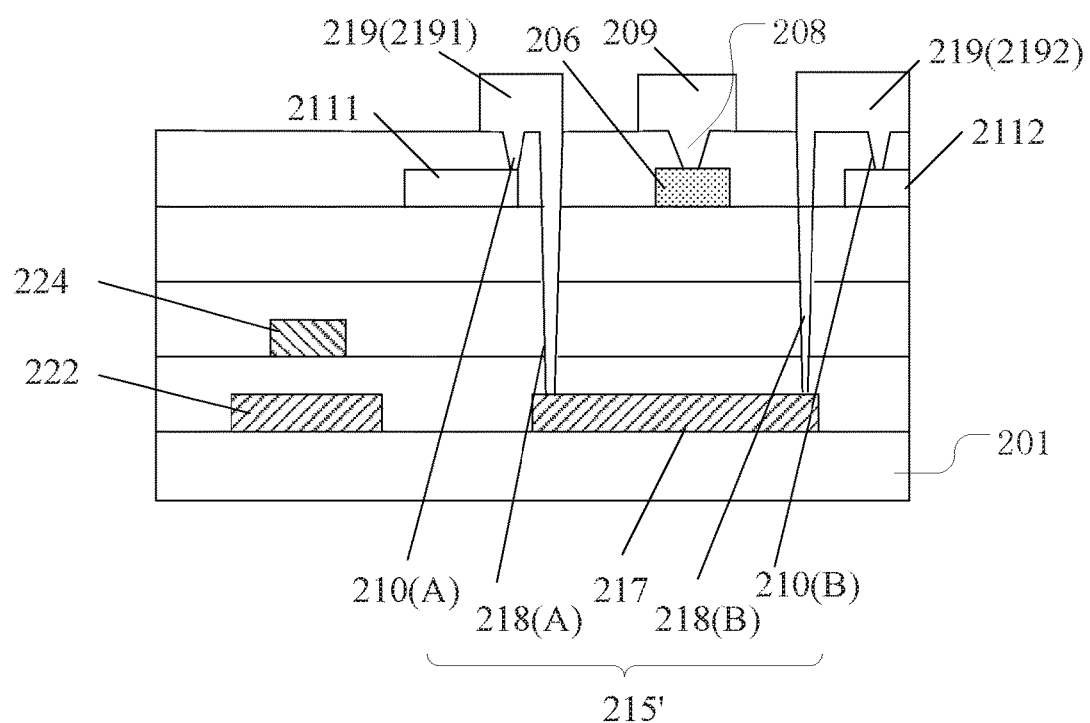
FIG. 2E is a schematic diagram of another bridge connection provided by an embodiment of the present disclosure.

FIG. 2E is a schematic diagram of another bridge connection provided by an embodiment of the present disclosure. The bridge connection shown in FIG. 2E differs from that of FIG. 2C in that each of the bridge 215 includes a first bridge conductor 217 and a second bridge conductor 219, a second via hole 210 and a third via hole 218, In order to prevent the pressure sensing elements 204 from contacting the touch electrode lines 206, at each portion where a respective pressure sensing line 211 comes across a touch electrode line 206, the two segments of the pressure sensing line 211 at the two sides of the touch electrode line 206 are connected to respective second bridge conductors 219 through respective second via holes 210, and the respective second bridge conductors 219 are connected to a first bridge conductor 217 through respective third via holes 218. Specifically, the pressure sensing line 2111 at the left side of the touch electrode line 206 is connected to a second bridge conductor 2191 through a second via hole 210A, and the second bridge conductor 2191 is connected to the first bridge conductor 217 through a third via hole 218A. The pressure sensing line 2112 at the right side of the touch electrode line 206 is connected to a second bridge conductor 2192 through a second via hole 210B, and the second bridge conductor 2192 is connected to the same first bridge conductor 217 through a third via hole 218B. Thereby, it can prevent a short circuit from being formed due to overlapping of the pressure sensing line 211 and the touch electrode line 206.

As shown in FIG. 2E, the second bridge conductors 219 are disposed at the fourth metal layer 24. It should be noted that, the second bridge conductors 219 can also be disposed at the gaps between the blocks of the touch electrodes 209, or a portion of electrode can be divided from a certain block of touch electrode 209 to serve as a second bridge conductor 219, which is not limited in the present disclosure.

The bridge connection as shown in FIG. 2E is advantageous over that of FIG. 2C in that, since both of the second bridge conductors 219 and the plurality of touch electrodes 2019 are positioned in the fourth metal layer 24, the second via hole 210, the third via holes 218 and the fourth via holes 208 can be fabricated through the same process. While in the bridge connection as shown in FIG. 2A, since the two segments of the pressure sensing lines 211 at the two sides of the crossing region are directly connected to the first bridge conductor 217, the first via hole 216 and the fourth via hole 208 have to be formed through two separate processes. That is, through the bridge connection provided in the present embodiment, by the transition of the second bridge conductor 219, it can save one process for etching a via hole. Therefore, the bridge connection as shown in FIG. 2E can simplify the process and facilitate the manufacture.

Figure 2F:
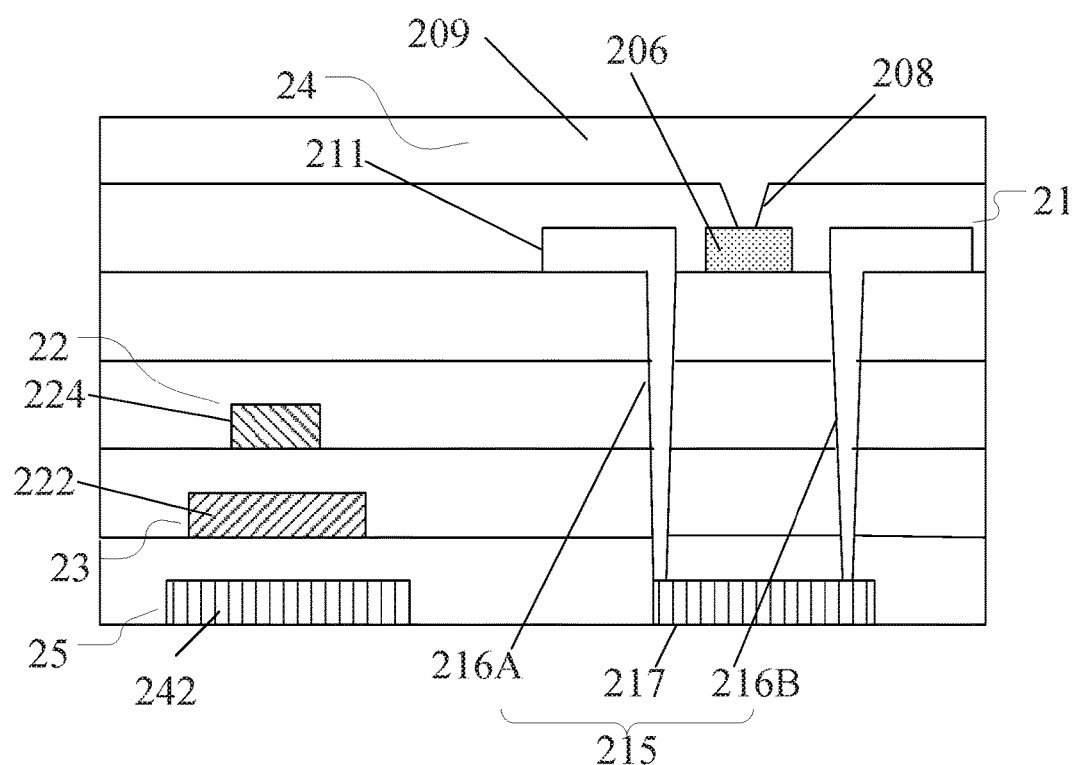
FIG. 2F is a schematic diagram of another bridge connection provided by an embodiment of the present disclosure.

FIG. 2F is a schematic diagram of another bridge connection provided by an embodiment of the present disclosure. As shown in FIG. 2F, a touch display panel 20 also includes a fifth metal layer 25 disposed between the first substrate 201 and the third metal layer 23. The fifth metal layer 25 includes segments of light shield metal pieces 242 thereon, and thus the fifth metal layer 25 is also referred to as a light shield metal layer. The light shield metal layer is generally disposed under an active layer (such as a low-temperature polysilicon layer) of the touch display panel with photosensitive TFT, for mitigating the influence of the backlight source on carriers of the active layer, and thus mitigating the influence on the leakage current of the photosensitive TFT. The bridge connection shown in FIG. 2F differs from that of FIG. 2A in that, by utilizing part of the light shield metal pieces 242 as the first bridge conductors 217, the contact between the pressure sensing lines 211 and the touch electrode lines 206 can be avoided. The bridge connection as shown in FIG. 2F is advantageous in that, the light shield metal layer on the touch display panel can be fully utilized, and the design freedom on the light shield metal layer is greater than that of the metal layer with the scan lines. Moreover, the light shield metal layer can be designed with the same pattern as the pressure sensing elements, to implement both of the bridge connection and the simplifying of the process. Also, in the bridge connection as shown in FIG. 2E, the first bridge conductors 217 can be implemented by utilizing part of the light shied metal pieces 242, which will not be elaborated herein.

Figure 3A:
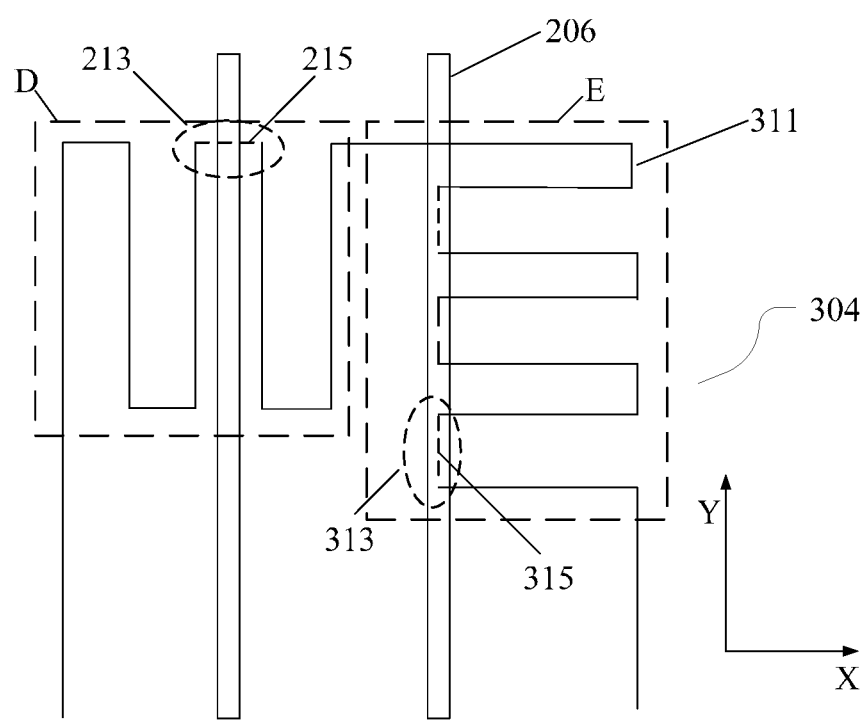
FIG. 3A is a schematic diagram of another pressure sensing element provided by an embodiment of the present disclosure.

FIG. 3A is a schematic diagram of another pressure sensing element provided by an embodiment of the present disclosure. As shown in FIG. 3A, pressure sensing elements 304 include segments of pressure sensing lines 311. The pressure sensing elements 304 differ from the pressure elements 204 in that, the pressure sensing elements 304 not only have a first comb-shaped structure D which extends in the direction Y and arranged in the direction X, but also have a second comb-shaped structure E which extends in the direction X and arranged in the direction Y. It can be seen from the configuration that, the second comb-shaped structure E turns 90° rightward of the first comb-shaped structure D. Thereby, the pressure sensing elements 304 can be seen as formed by the pressure elements 204 connected in series with the pressure elements 204 turning 90° rightward. The pressure sensing elements 304 have advantages over the pressure elements 204 in that, when a pressure is applied on the panel from outside, main strain directions of the pressure sensing elements 304 can include both of the direction X and the direction Y. Thereby, the pressure sensing elements 304 can sense changes of resistance caused by strain in both of the direction X and the direction Y, to detect the amplitude of the pressure.

As shown in FIG. 3A, when the touch display panel 20 are provided with the pressure sensing elements 304, pressure sensing lines 311 of the pressure sensing elements 304 and the touch electrode lines 206 have crossing regions 313 in addition to the crossing regions 213 as shown in FIG. 2D. The pressure sensing lines 311 extend along the direction Y at the crossing regions 313. Therefore, in order to prevent short circuits from being formed at the crossing regions 213 and 313 by the pressure sensing elements 304 and the touch electrode lines 206, the pressure sensing lines 311, in this embodiment, are connected through bridges 215 over the touch electrode lines 206 at the crossing regions 213, and the pressure sensing lines 311 are connected through bridges 315 over the touch electrode lines 206 at the crossing regions 313. The bridge connection through the bridges 215 in the crossing regions 213 is similar to the bridge connection as shown in FIG. 2D, which will not be repeated herein.

Figure 3B:
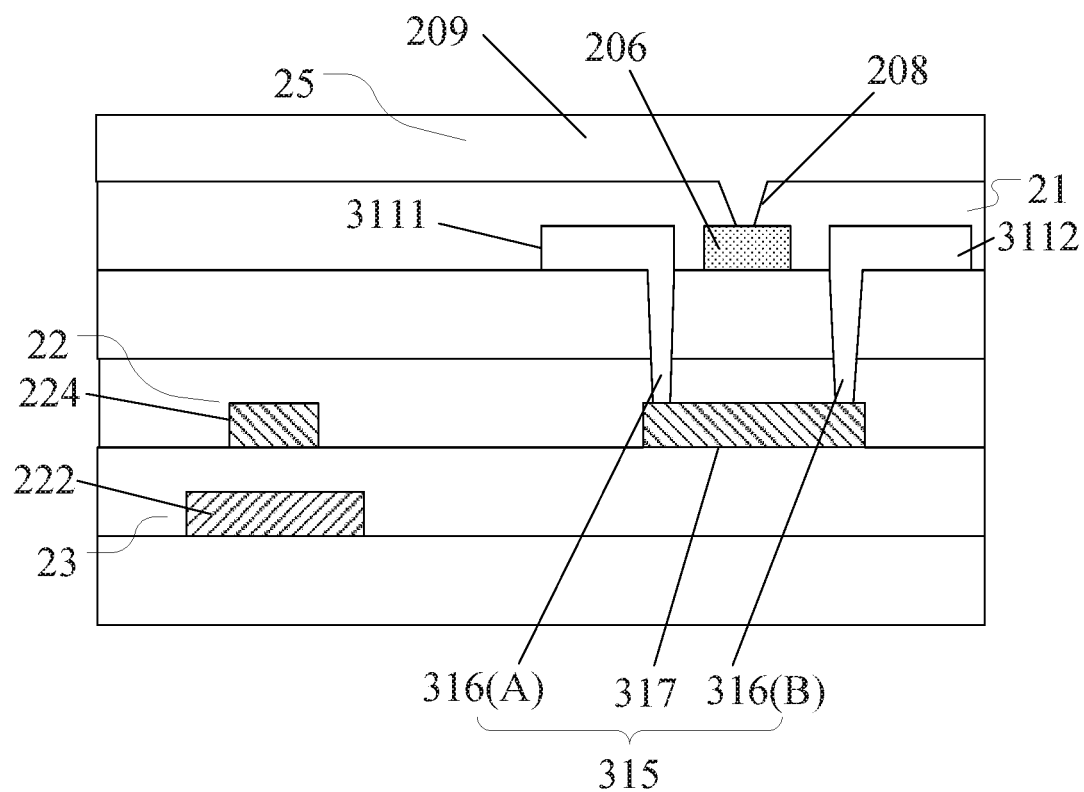
FIG. 3B is a schematic diagram of another bridge connection provided by an embodiment of the present disclosure.

FIG. 3B is a schematic diagram of another bridge connection provided by an embodiment of the present disclosure. As shown in FIG. 3B, each of the bridges 315 includes a first bridge conductor 317 and a first via hole 316. In order to prevent the pressure sensing lines 311 from contacting the touch electrode lines 206, in this bridge connection, at each of the crossing regions 313 of the pressure sensing lines 311 and the touch electrode lines 206, two segments of a respective pressure sensing line 311 at two sides of a respective touch electrode line 206 are connected to the same first bridge conductor 317 respectively through a first via hole 316, so as to avoid the contact between the pressure sensing line 311 and the touch electrode line 206. Specifically, a pressure sensing line 3111 at the left side of the touch electrode line 206 is connected to the first bridge conductor 317 through a first via hole 316A, and a pressure sensing line 3112 at the right side of the touch electrode line 206 is connected to the same first bridge conductor 317 through a first via hole 316B. Thereby, it can prevent a short circuit from being formed due to overlapping of the pressure sensing line 311 and the touch electrode line 206.

Since at the crossing regions 313 of the pressure sensing elements 304 and the touch electrode lines 206, the pressure sensing lines 311 extend in the direction Y, the first bridge conductors 317, in this bridge connection, are disposed in the second metal layer 22. In this embodiment, this design has advantages in that, the first bridge conductors 317 can be fabricated through the same process with the data lines 224. Since the data lines 224 also extend in the direction Y, this design can ensure that the first bridge conductors 317 extend in the direction Y and moreover, this design can improve the utilization of the second metal layer 22.

Figure 3C:
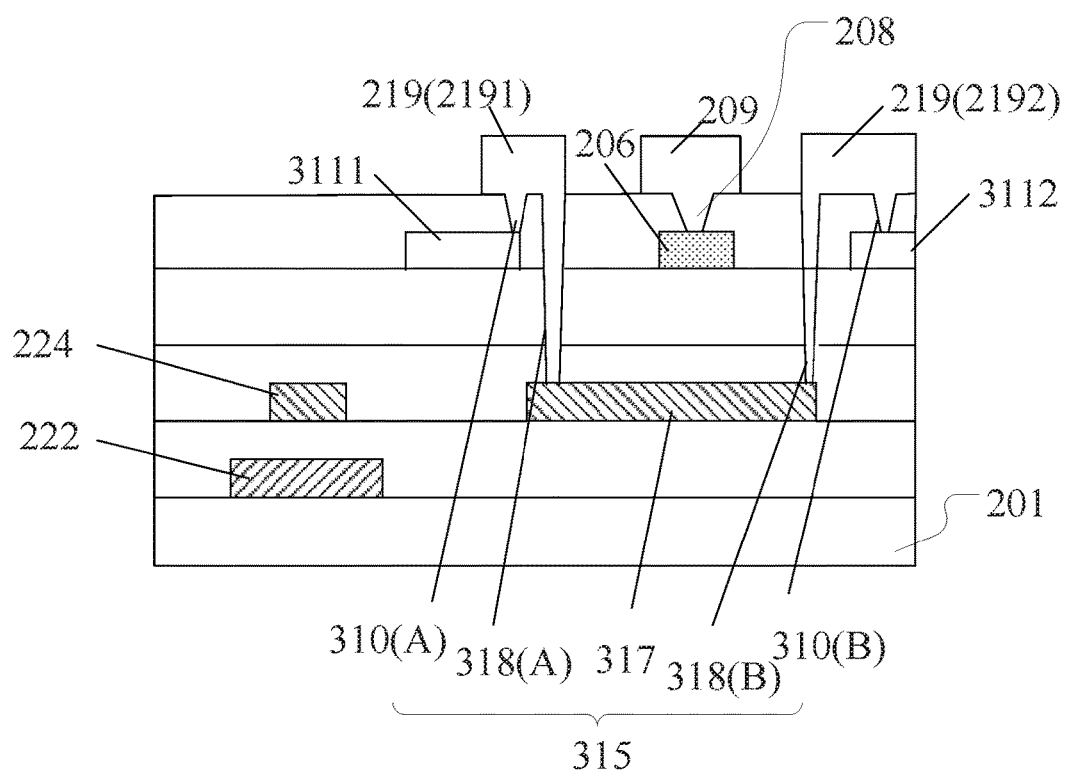
FIG. 3C is a schematic diagram of another bridge connection provided by an embodiment of the present disclosure.

Similarly, as shown in FIG. 3C, the connection through the bridges 315 in the present embodiment can also be provided with the second bridge conductor 219 as transition. In that case, each of the pressure sensing lines 311 is firstly connected to a second bridge conductor 219 through a second via hole 310, and then two segments of second bridge conductors 219 are connected to the same first bridge conductor 317 through a third via hole 318. This can save one process for forming via holes. The idea involved is similar to the above embodiments, and will not be repeated herein.

Similarly to the above embodiment as shown in FIG. 2F, the bridges 315 in the present embodiment can utilize part of the light shield metal pieces as the first bridge conductors, and improve the utilization of the light shield metal layer. The details will not be repeated herein.

Figure 4:
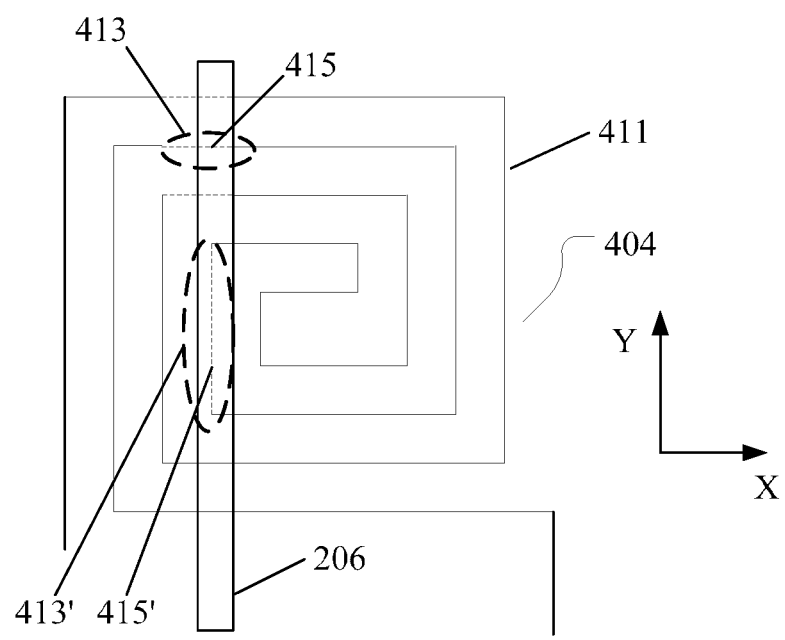
FIG. 4 is a schematic diagram of another pressure sensing element provided by an embodiment of the present disclosure.

FIG. 4 is a schematic diagram of another pressure sensing element provided by an embodiment of the present disclosure. As shown in FIG. 4, pressure sensing elements 404 include segments of pressure sensing lines 411. The pressure sensing elements 404 differ from the pressure sensing elements 204 and 304 in that, the pressure sensing elements 404 form a spiral structure bending repeatedly along the directions X and Y. The spiral structure design of the pressure sensing elements 404 has advantages in that, when a pressure is applied on the panel from outside, the pressure sensing elements 404 can sense a strain in any direction, that is, not limited to the two directions X and Y. Therefore, the pressure sensing elements 404 can sense change of resistance caused by strain in any direction, to detect the amplitude of the pressure.

When the touch display panel is provided with the pressure sensing elements 404, the pressure sensing elements 404 inevitably come across the touch electrode lines 206, as shown in FIG. 4. There exist crossing regions 413 and 413', where in the crossing regions 413, pressure sensing lines 411 extend along the direction X, and in the crossing regions 413', pressure sensing lines 411 extend along the direction Y. As shown in FIG. 4, the pressure sensing elements 404 are connected through bridges 415 in the crossing regions 413 and the pressure sensing elements 404 are connected through bridges 415' in the crossing regions 413'. Where, the bridges 415 can be any of the connection as shown in FIGS. 2C, 2E and 2F, and the bridges 415' can be any of the connection as shown in FIGS. 3B and 3C, which will not be repeated herein.

Figure 5A:
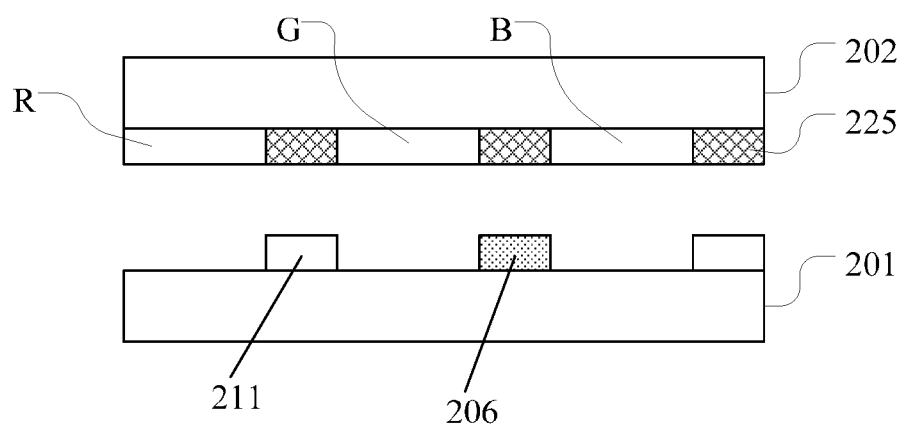
FIG. 5A is a structural diagram of a profile of a touch display panel provided by an embodiment of the present disclosure.
Figure 5B:
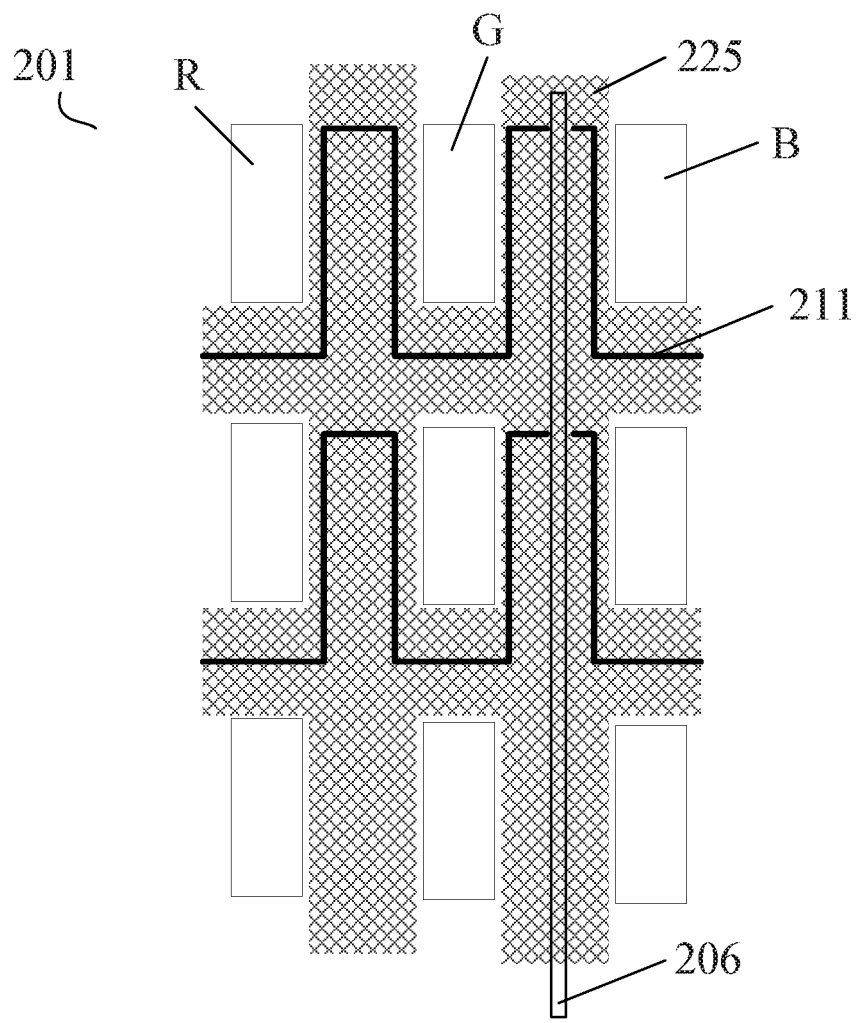
FIG. 5B is a structural diagram of a partial projection of a touch display panel provided by an embodiment of the present disclosure.

FIG. 5A is a structural diagram of a profile of a touch display panel provided by an embodiment of the present disclosure. As shown in FIG. 5A, the touch display panel 20 provided by the present embodiment is also provided with a second substrate 202. A plurality of pixel regions R, G and B are provided on one side of the second substrate 202 which is proximate to the first substrate 201, and a black matrix 225 is provided between any two adjacent pixel regions. In the touch display panel 20 provided by the present disclosure, projections of the black matrices on the plane of the first substrate 201 cover the segments of pressure sensing lines of the pressure sensing elements and the touch electrode lines, so as to ensure that the aperture ratio of the touch display panel will not be affected by the pressure sensing elements. As shown in FIG. 5B (referring to the pressure sensing elements 204 for example), projections of the black matrices 225 on the plane of the first substrate 201 cover the segments of pressure sensing lines 211 and the touch electrode lines 206.

As discussed above, in the touch display panel provided by the present disclosure, pressure sensing elements are provided by utilizing gaps of the metal layers of the touch lines in existing design of the prior art, to implement features of display, touch and pressure touch, without increasing the thickness of the product in existing design of the prior art.

In the above embodiments, the touch display panel also includes, on the first substrate, essential components such as a pixel unit defined by a scan line and a data line, a TFT device, a circuit structure, a pixel electrode, an insulate layer and the like. Where, the gate of the TFT device is connected to the scan lines, one of the source and the drain of the TFT device is connected to the data lines, and the other of the source and the drain is connected to the pixel unit. This is well known in the art, and will not be repeated herein.

The present disclosure also provides a touch display device, which includes any one of the above touch display panels. The touch display device can be a mobile phone, a desktop computer, a laptop computer, a tablet computer, an electronic album, or the like.

The above is detailed description of the present disclosure with reference to preferred embodiments. It should not be understood that the specific implementation of the present disclosure is limited to the description. For those ordinary skilled in the art which the present disclosure pertains, many simple modification or replacement can also be made without departing from the concept of the present disclosure, which should be deemed as falling into the protective scope of the present invention.

What is claimed is:

1. A touch display panel, comprising:
a first substrate; and
a first metal layer formed on one side of the first substrate, the first metal layer comprising a plurality of touch electrode lines and a plurality of pressure sensing elements, wherein
the pressure sensing elements comprise segments of pressure sensing lines, and
at each crossing region where one of the plurality of touch electrode lines comes across one of the plurality of pressure sensing elements, two adjacent segments of pressure sensing lines being connected through a bridge;
a second metal layer formed between the first substrate and the first metal layer, the second metal layer comprising a plurality of data lines extending along a first direction; and
a third metal layer formed between the second metal layer and the first substrate, the third metal layer comprising a plurality of scan lines extending along a second direction which is orthogonal to the first direction.

2. The touch display panel of claim 1, wherein the pressure sensing elements comprise a comb-shaped structure extending along the first direction and arranged along the second direction.

3. The touch display panel of claim 1, wherein the pressure sensing elements comprise a first comb-shaped structure extending along the first direction and arranged along the second direction, and a second comb-shaped structure extending along the second direction and arranged along the first direction.

4. The touch display panel of claim 1, wherein the pressure sensing elements comprise a spiral structure bending repeatedly along the directions X and Y.

5. The touch display panel of claim 1, further comprising:
a plurality of first bridge conductors and a plurality of first via holes, wherein two segments of pressure sensing lines at two sides of each said crossing region are connected to one first bridge conductor corresponding to the crossing region respectively through a first via hole.

6. The touch display panel of claim 5, wherein when the pressure sensing lines extend along the first direction at the crossing regions, the first bridge conductors are disposed in the second metal layer.

7. The touch display panel of claim 5 wherein when the pressure sensing lines extend along the second direction at the crossing regions, the first bridge conductors are disposed in the third metal layer.

8. The touch display panel of claim 5, further comprising a fifth metal layer, wherein the fifth metal layer comprises segments of light shield metal pieces, and part of the light shield metal pieces are also utilized as the first bridge conductors.

9. The touch display panel of claim 1, further comprising:
a plurality of first bridge conductors, a plurality of second bridge conductors, a plurality of second via holes and a plurality of third via holes, wherein each of the two segments of pressure sensing lines at two sides of each said crossing region is connected to one second bridge conductor through one second via hole, and two second bridge conductors at two sides of each said crossing region are connected to one first bridge conductor corresponding to the crossing region respectively through a third via hole.

10. The touch display panel of claim 9, wherein when the pressure sensing lines extend along the first direction at the crossing regions, the first bridge conductors are disposed in the second metal layer.

11. The touch display panel of claim 9, wherein when the pressure sensing lines extend along the second direction at the crossing regions, the first bridge conductors are disposed in the third metal layer.

12. The touch display panel of claim 9, further comprising a fourth metal layer, wherein the second bridge conductors are disposed on the fourth metal layer.

13. The touch display panel of claim 12, wherein the fourth metal layer comprises a plurality of touch electrodes, and the touch electrodes are connected to the touch electrode lines through fourth via holes.

14. The touch display panel of claim 13, wherein the first via holes, the second via holes, the third via holes and the fourth via holes are formed through the same process.

15. The touch display panel of claim 9, further comprising a fifth metal layer, wherein the fifth metal layer comprises segments of light shield metal pieces, and part of the light shield metal pieces are also utilized as the first bridge conductors.

16. The touch display panel of claim 1, further comprising a second substrate disposed opposite to the first substrate, wherein the second substrate is provided with a plurality of black matrices, and projections of the black matrices cover the pressure sensing elements in a plane of the first substrate.

17. A touch display device, comprising the touch display panel of claim 1.

* * * * *